Sept. 10, 1963  J. J. MORONEY  3,103,394

TWO-WAY THRUST BEARING

Filed June 15, 1961

JOHN J. MORONEY
*INVENTOR*

BY Mason, Porter, Diller & Stewart

ATTORNEYS

United States Patent Office 3,103,394
Patented Sept. 10, 1963

3,103,394
TWO-WAY THRUST BEARING
John J. Moroney, Torrington, Conn., assignor to The Torrington Company, Torrington, Conn., a corporation of Maine
Filed June 15, 1961, Ser. No. 117,472
7 Claims. (Cl. 308—219)

The present invention relates to a two-way thrust bearing adapted for application to a wide variety of situations where a rotary shaft or the like is subject to thrust in opposite directions as well as possible radial movement.

Small machines driven by electric motors frequently impose longitudinal thrusts on the motor shaft in one or both directions. A simple antifriction bearing is thus required to withstand opposite longitudinal thrusts and also possible radial play.

The following described invention has been developed to meet this problem in a simple and efficient manner.

It is the purpose of this invention to provide a self-contained bearing which can be mounted to receive a rotary shaft withstanding two-way thrust, that is, axial movement in either direction. At the same time the bearing will be free from any stress imposed on the shaft or the machine frame.

It is a further object of the invention to assemble this bearing as a self-contained unit for application wherever needed without adjustment other than mere attachment to the rotary shaft to be held and appropriate mounting on the machine frame.

It is a further object of this invention to form this bearing assembly from drawn or stamped sheet metal parts. In this way these parts can be readily hardened after forming. The complete assembly is light in weight, compact in form and capable of convenient packaging. It is moreover easily installed without special tools or particular skill.

For purposes of illustration and by way of example, I have shown the preferred form on the accompanying drawings in which.

Figure 1:
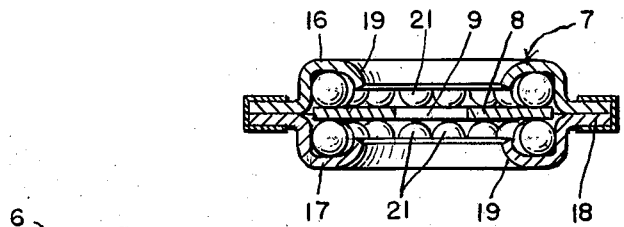
FIG. 1 is a transverse cross-section taken on the line 1—1 in FIG. 2.
Figure 4:
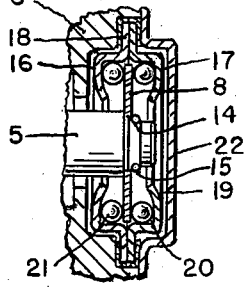
FIG. 4 is a fragmentary similar view showing a modified mounting.
Figure 2:
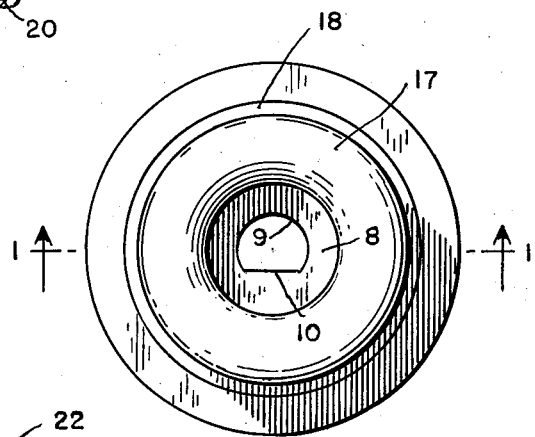
FIG. 2 is a front elevation of the complete bearing unit.

Essentially, the invention consists in providing a wear plate to be fitted on the rotary shaft subject to two-way thrusts, and an antifraction bearing on each opposite side of the wear plate.

As shown in the drawings, the invention has been applied to a shaft 5, loosely carried within the machine frame 6. The frame is recessed to receive the bearing assembly, denoted in general by 7.

For cooperation with the bearing assembly 7, the shaft 5 carries a wear plate 8. This wear plate is in the form of a disc having a center aperture 9 generally circular, but with one projection in the form of a segmental key 10. This constitutes a key for engagement between the wear plate 8 and the shaft 5.

The shaft 5 has a reduced periphery which conforms in shape to the outline of the central aperture 9.

A washer 11 fits over the end of the shaft 5 and against the wear plate 8. The shaft 5 is drilled axially and screw-threaded to receive the machine screw 13. Tightening the screw 13 clamps the washer against the wear plate 8 and holds the latter tightly on the shaft 5.

The provision of the key 10 insures that the wear plate 8 will rotate with the shaft 5 without slipping. Any similar means of providing a key and corresponding recess for this engagement can be substituted.

In like manner, the end of the shaft 5 may project beyond the wear plate 8 to provide a base having a circumferential groove 14.

By fitting a split ring 15 within the groove 14, an alternative form of attachment for the wear plate is provided.

Figure 3:
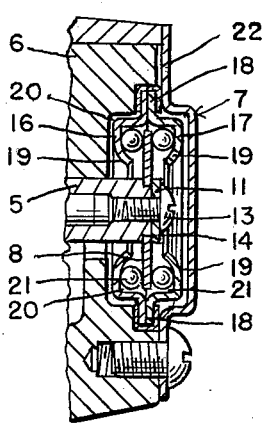
FIG. 3 is a vertical cross-section showing the bearing as fitted for use with a rotary shaft.

For cooperaiton with the wear plate 8 there are provided two identical and symmetrically disposed drawn metal cups 16, 17. These cups have peripheral flanges 18, 18, which abut in the plane of the wear plate as shown in FIG. 3. These cups have open centers provided by inturned edges 19, 19. The channels 20, 20 thus formed between the outer portions of the cups 16, 17 and the edges 19, 19 form channel or raceways to accommodate ball bearings.

A series of ball bearings 21, 21 is held within each channel 20. The cups are prevented from centrifugal movement by the shoulders of the cups and likewise prevented from dislodgment axially by the inturned edges 19, 19.

The wear plate is free to move radially with respect to the ball bearing. At the same time, thrust of the shaft in either direction will be withstood by one or the other of the series of bearing balls.

The outer flanges 18, 18 are held together by means of a band 21. This is of sheet metal spun or staked into position or resiliently wrapped around the flanges to hold them permanently together. Other fastening means are also suitable.

The bearing assembly thus formed is capable of being suitably mounted in the frame 6 of the machine. As shown in FIG. 3, the frame is recessed to provide space to receive the inner cup 16, while the band 21 is also held within a circular recess.

A suitable cover plate 22 is bolted on the face of the machine 6 and serves to confine the bearing cups against movement.

In some instances resilient means such as wave washers or shake-proof washers are provided within the cover plate 22 to bear resiliently against the outer cup 17.

The bearing is a unitary assembly which can be handled as a unit and installed by attachment only to the shaft. The bearing cups rest wherever convenient on the machine frame or base and allow the utmost freedom of the motor shaft from binding.

The preferred form of the invention has been illustrated by way of example, but many minor changes can be made in structural details, arrangements and material without departing from the invention as defined in the following claims.

What I claim is:

1. In combination with a rotary shaft having a keyway, a two-way thrust bearing assembly unit comprising a central wear plate having a central segmental key for fixed mounting engagement with the keyway of said shaft, a flanged sheet metal bearing cup on each side of the plate, a series of bearing balls between the plate and each cup and means for fastening the cups together at their peripheries independent of other support.

2. In combination with a rotary shaft having a keyway, a two-way thrust bearing assembly unit comprising a central wear plate having a central segmental key for fixed mounting on said shaft in engagement with said keyway of the shaft, a flanged sheet metal bearing cup on each side of the plate, a series of bearing balls between the plate and each cup and means for fastening the cups together at their peripheries independent of other support.

3. In combination with a rotary shaft having a keyway, a two-way thrust bearing assembly unit comprising a central wear plate having a central segmental key for fixed engagement with the keyway of said shaft, a flanged sheet metal bearing cup on each side of the plate, each said cup having an inner inturned edge forming an annular channel, a series of bearing balls between the wear plate and the channel in each cup and means for fastening the cups together at their peripheries.

4. In combination with a rotary shaft having a keyway, a two-way thrust bearing assembly unit comprising a central wear plate having a central segmental key for fixed engagement with the keyway of said shaft, a flanged sheet metal bearing cup on each side of the plate, said cups having abutting peripheral flanges in the plane of the wear plate, each said cup having an inner inturned edge, forming an annular channel, a series of bearing balls between the wear plate and the channel in each cup and means for fastening the flanges of the cups together.

5. In combination, a rotary shaft having a reduced periphery with a depressed portion forming a recess, a wear plate having a central aperture with a corresponding key for engagement in the recess, means for fastening the plate on the peripheral portion of the shaft, a sheet metal bearing cup on each side of the wear plate, a series of bearing balls between the plate and each cup and means for fastening the cups together at their peripheries.

6. In combination, a rotary shaft having a reduced periphery with a depressed portion forming a recess, a wear plate having a central aperture with a corresponding key for engagement in the recess, a washer, a screw holding the washer against the plate to prevent relative movement between the latter and the shaft, a sheet metal bearing assembly unit having a cup on each side of the wear plate, a series of bearing balls between the plate and each cup and means for fastening the cups together at their peripheries.

7. In combination, a rotary shaft having a reduced periphery with a depressed portion forming a recess, and a contiguous circumferential groove, a wear plate having a central aperture with a corresponding key for engagement in the recess, a split ring in the groove in contact with the wear plate, a sheet metal bearing assembly unit having a cup on each side of the wear plate, a series of bearing balls between the plate and each cup and means for fastening the cups together at their peripheries.

References Cited in the file of this patent

UNITED STATES PATENTS

| | | |
|---|---|---|
| 986,482 | Messink | Mar. 14, 1911 |
| 1,592,665 | Janette | July 13, 1926 |
| 1,947,066 | Sieg | Feb. 13, 1934 |
| 2,253,119 | Goerth | Aug. 19, 1941 |
| 2,307,772 | Duffy | Jan. 12, 1943 |
| 2,941,853 | Bartholomaus | June 21, 1960 |